United States Patent
Chiba (10) Patent No.: US 9,915,549 B2
(45) Date of Patent: Mar. 13, 2018

(54) INFORMATION PROCESSING APPARATUS, INFORMATION PROCESSING METHOD, AND PROGRAM CAUSING COMPUTER TO EXECUTE PROCESSING IN INFORMATION PROCESSING APPARATUS

(71) Applicant: Alpine Electronics, Inc., Tokyo (JP)

(72) Inventor: Kazuomi Chiba, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 15/359,132

(22) Filed: Nov. 22, 2016

(65) Prior Publication Data

US 2017/0205245 A1    Jul. 20, 2017

(30) Foreign Application Priority Data

Jan. 14, 2016   (JP) .................... 2016-004925

(51) Int. Cl.
| | | |
|---|---|---|
| *G01C 21/00* | (2006.01) | |
| *G01C 21/36* | (2006.01) | |
| *G01C 21/32* | (2006.01) | |

(52) U.S. Cl.
CPC ......... *G01C 21/3673* (2013.01); *G01C 21/32* (2013.01)

(58) Field of Classification Search
CPC ........................... G01C 21/3673; G01C 21/32
See application file for complete search history.

(56) References Cited

U.S. PATENT DOCUMENTS

| | | | |
|---|---|---|---|
| 2003/0050756 A1 | 3/2003 | McGovern | |
| 2011/0167065 A1* | 7/2011 | Toyoda | G01C 21/32 707/737 |
| 2011/0191266 A1* | 8/2011 | Matsuyama | G06Q 50/06 705/412 |
| 2016/0371300 A1* | 12/2016 | Yamada | G06F 17/30241 |

FOREIGN PATENT DOCUMENTS

JP        2009-014692 A       1/2009

* cited by examiner

*Primary Examiner* — Adam M Alharbi
(74) *Attorney, Agent, or Firm* — Brinks Gilson & Lione (57) ABSTRACT

An information processing apparatus has a storage unit that stores road map information about road maps and a display control means for displaying a road map including road names on a display unit according to the road map information. The information processing apparatus includes a road name deciding means for deciding whether a road included in the road map has a road name, a facility deciding means for deciding, if the road name deciding means has decided that the road has no road name, whether a facility is related to the road, and a road name assigning means for assigning, if the facility deciding means has decided that a facility is related to the road, a name to the road on the basis of facility information about the facility.

15 Claims, 9 Drawing Sheets

| FACILITY NAME | ADDRESS OF FACILITY | INFORMATION RELATED TO FACILITY |
|---|---|---|
| P CONVENIENCE STORE | P CONVENIENCE STORE ST., 1-1-3, AA TOWN, BB CITY, CC STATE | KIND OF BUSINESS: CONVENIENCE STORE, ......... |
| xx GS | P CONVENIENCE STORE ST., 1-1-23, AA TOWN, BB CITY, CC STATE | KIND OF BUSINESS: GAS STATION, COFFEE SHOP, ......... |
| YH TEMPLE | YH TEMPLE ST., 2-11-3, AA TOWN, BB CITY, CC STATE | KIND OF BUSINESS: KINDERGARTEN LOCATED BESIDE TEMPLE, ......... |
| XX STORE | YH TEMPLE ST., 2-15-3, AA TOWN, BB CITY, CC STATE | KIND OF BUSINESS: DEPARTMENT STORE, ......... |
| ......... | ......... | ......... |

INFORMATION PROCESSING APPARATUS, INFORMATION PROCESSING METHOD, AND PROGRAM CAUSING COMPUTER TO EXECUTE PROCESSING IN INFORMATION PROCESSING APPARATUS

RELATED APPLICATION

The present application claims priority to Japanese Patent Application Number 2016-004925, filed Jan. 14, 2016, the entirety of which is hereby incorporated by reference.

BACKGROUND

1. Field

The present disclosure relates to an information processing apparatus that displays a road map including road names on a display unit according to road map information, as well as an information processing method and a program that causes a computer to execute processing in the information processing apparatus.

2. Description of the Related Art

A map display screen that provides route guidance on a smart phone, a navigation device, or the like is convenient in that, for example, a prescribed road name (Tower St. or XX Shop St., for example) is displayed together with a travel route so that a travel direction can be clearly recognized. In some countries or areas, however, roads are not named (particularly, many unnamed roads are present in, for example, developing countries). Therefore, there is a case in which the above convenience of a road name being displayed cannot be provided.

Figure 4A:
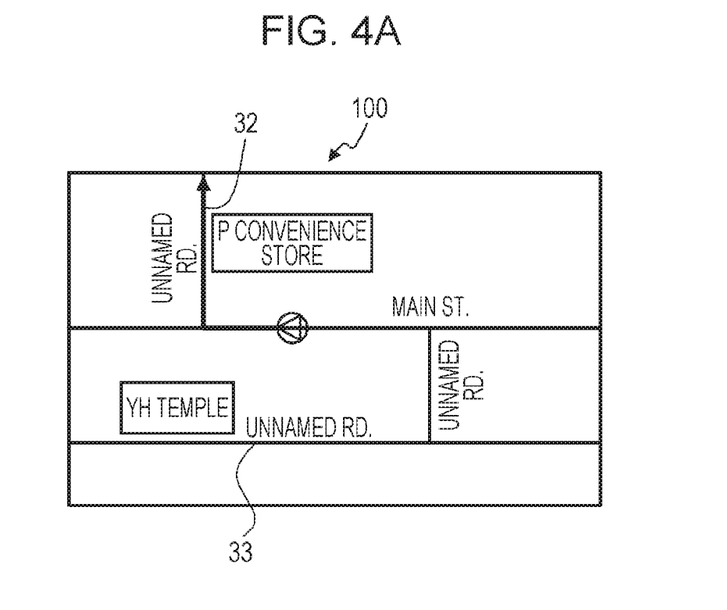
FIG. 4A illustrates a schematic road map displayed on the display unit of a conventional navigation apparatus.
Figure 4B:
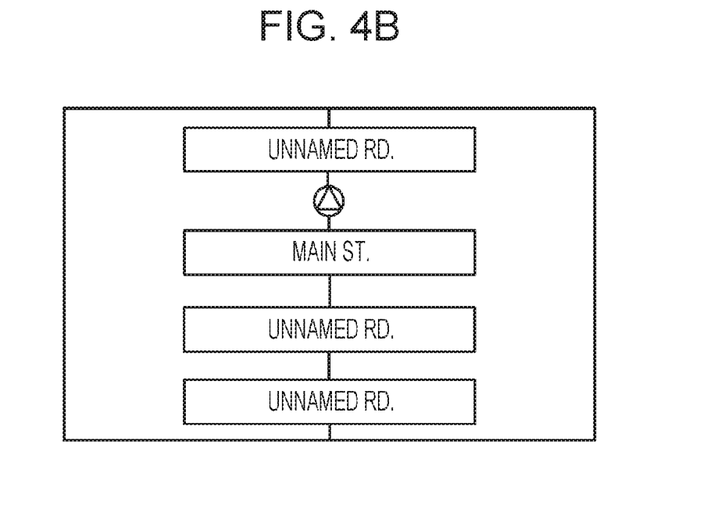
FIG. 4B illustrates a schematic process chart for route guiding roads, the chart being displayed on the display unit of the conventional navigation apparatus.

As illustrated in FIG. 4A, which illustrates a guide route screen that displays a road map including a guide route, and in FIG. 4B, which illustrates a process screen for a guide route during travel, UNNAMED RD., for example, is displayed for an unnamed road on a guide route in a road map 100. In this case, it may be difficult to accurately identify the vehicle position 101. In an address search in EU countries, North America and other countries, a house No., a road name, a city name, and the like are entered, for example, "111, KB St., AB city". In an area in which roads are unnamed (in which case a road name cannot be included in an address), therefore, an address search does not work.

In a navigation apparatus disclosed in Japanese Unexamined Patent Application Publication No. 2009-14692, if the road name of the road on which the vehicle is currently traveling cannot be detected or the road is unnamed, the road name of the closest of detected roads located ahead in the travel direction is detected and is displayed as a temporary road name.

SUMMARY

Even if a road on which the vehicle is traveling is unnamed, the navigation apparatus disclosed in Japanese Unexamined Patent Application Publication No. 2009-14692 displays the road name of the closest road located ahead in the travel direction as a tentative road name, providing the user with a convenient way. If, however, many unnamed roads are present as described above, a case may occur in which a tentative road name cannot be displayed.

An object of the present disclosure is to provide an information processing apparatus that assigns a road name to an unnamed road on the basis of, for example, the name of a facility around the road, and displays the assigned road name on a screen; and, also provide an information processing method and a program that causes a computer to execute processing in the information processing apparatus.

To solve the above problem, the information processing apparatus according to the present disclosure has a storage unit that stores road map information about road maps and also has a display control means for displaying a road map including road names on a display unit according to the road map information, a road name deciding means for deciding whether a road included in the road map has a road name, a facility deciding means for deciding, if the road name deciding means has decided that the road has no road name, whether a facility is related to the road, and a road name assigning means for assigning, if the facility deciding means has decided that a facility is related to the road, a name to the road on the basis of facility information about the facility.

In this structure, if a road included in a road map is decided to have no road name, a road name is assigned to the road on the basis of the facility information about the facility related to the road, so positional information in the road map may be more accurately provided. When a road name is assigned, it is also possible to search for an address on the basis of the road name. An example of assigning a name to a road on the basis of the facility information about the facility related to the road is to assign the name of a facility that is located beside the road so as to face it.

The information processing apparatus according to the present disclosure may further have a guide route searching means for searching for a guide route to an entered destination according to the road map information. The road name deciding means may decide whether a road in a prescribed range that includes the guide route has a road name.

In this structure, since a road name is assigned to an unnamed road during a search for a guide route, the search being made according to the road map information, a guide route can be provided in a state in which the current position is clarified. An example of the road in a prescribed range that includes the guide route is a road included in a road map, displayed on the display unit, that includes the guide route.

In the information processing apparatus according to the present disclosure, the road name assigning means may follow a predetermined priority order to assign a name to the road on the basis of the facility information about the facility related to the road.

In this structure, since a predetermined priority order is followed to assign a name to the road on the basis of the facility information about the facility related to the road, positional information can be clarified due to the assigned road name. An example of the predetermined priority order is an order determined according to degrees to which facilities related to the road are public, according to the number of persons who enter and exit the facilities, or according to the distance from a traffic intersection.

The information processing apparatus according to the present disclosure may further have a road name storing means for causing the storage unit to store facility information about a facility related to the road to which the road name has been assigned by the road name assigning means, the storage device storing the facility information in relation to the road name, and a searching means for searching for the road map information, which is stored in the storage unit, according to input information about a facility, the input information being entered from an operation unit. The searching means may search for the road map information according to input information including the road name.

In this structure, since facility information about a facility related to the road to which the road name has been assigned is stored in the storage unit in relation to the road name, a target facility can be accessed by making a search in which a road name is included as input information.

In the information processing apparatus according to the present disclosure, facility information including the assigned road name may be stored in the storage unit in relation to link information about roads included in the road map information.

In this structure, since facility information about a facility related to a road to which a road name is assigned is stored in relation to link information about the road to which the road name is assigned, a facility search based on a road name can be easily made.

The information processing method according to the present disclosure has a display control step of displaying a road map including road names on a display unit according to road map information about road maps, a road name deciding step of deciding whether a road included in the road map information has a road name, a facility deciding step of deciding, if the road has been decided to have no road name in the road name deciding step, whether a facility is related to the road, and a road name assigning step of assigning, if a facility has been decided to be related to the road in the facility deciding step, a name to the road on the basis of facility information about the facility.

In this configuration, if a road is decided to have no road name, a road name is assigned to the road on the basis of facility information about a facility related to the road, so positional information in the road map may be more accurately provided.

The information processing method according to the present disclosure may further have a guide route searching step of searching for a guide route to an entered destination according to the road map information. In the road name deciding step, it may be decided whether a road in a prescribed range that includes the guide route has a road name.

In the information processing method according to the present disclosure, in the road name assigning step, a predetermined priority order may be followed to assign a name to the road on the basis of the facility information about the facility related to the road.

The information processing method according to the present disclosure may further have a road name storing step of causing the storage unit to store facility information about a facility related to the road to which the road name has been assigned in the road name assigning step, the storage device storing the facility information in relation to the road name, and a searching step of searching for the road map information, which is stored in the storage unit, according to input information about a facility, the input information being entered from an operation unit. In the searching step, the road map information may be searched for according to input information including the road name.

In the information processing method according to the present disclosure, facility information including the assigned road name may be stored in the storage unit in relation to link information about roads included in the road map information.

The program according to the present disclosure causes a computer to execute processing in an information processing apparatus that displays a road map including road names on a display unit according to road map information about road maps, a road name deciding step of deciding whether a road included in the road map information has a road name, a facility deciding step of deciding, if the road has been decided to have no road name in the road name deciding step, whether a facility is related to the road, and a road name assigning step of assigning, if a facility has been decided to be related to the road in the facility deciding step, a name to the road on the basis of facility information about the facility.

The program according to the present disclosure may cause the computer to further execute a guide route searching step of searching for a guide route to an entered destination according to the road map information. In the guide route searching step, it may be decided whether a road in a prescribed range that includes the guide route has a road name.

In the program according to the present disclosure, in the road name assigning step, a predetermined priority order may be followed to assign a name to the road on the basis of the facility information about the facility related to the road.

The program according to the present disclosure may cause the computer to further execute a road name storing step of causing the storage unit to store facility information about a facility related to the road to which the road name has been assigned in the road name assigning step, the storage device storing the facility information in relation to the road name, and a searching step of searching for the road map information, which is stored in the storage unit, according to input information about a facility, the input information being entered from an operation unit. In the searching step, the road map information may be searched for according to input information including the road name.

In the program according to the present disclosure, facility information including the assigned road name may be stored in the storage unit in relation to link information about roads included in the road map information.

According to the present disclosure, if a road included in a road map is decided to have no road name, a road name is assigned to the road on the basis of facility information about a facility related to the road, so positional information in the road map may be more accurately provided. When a road name is assigned, it is also possible to search for an address on the basis of the road name.

DESCRIPTION OF THE PREFERRED EMBODIMENT

An embodiment of the present disclosure will be described with reference to the drawings.

Figure 1:
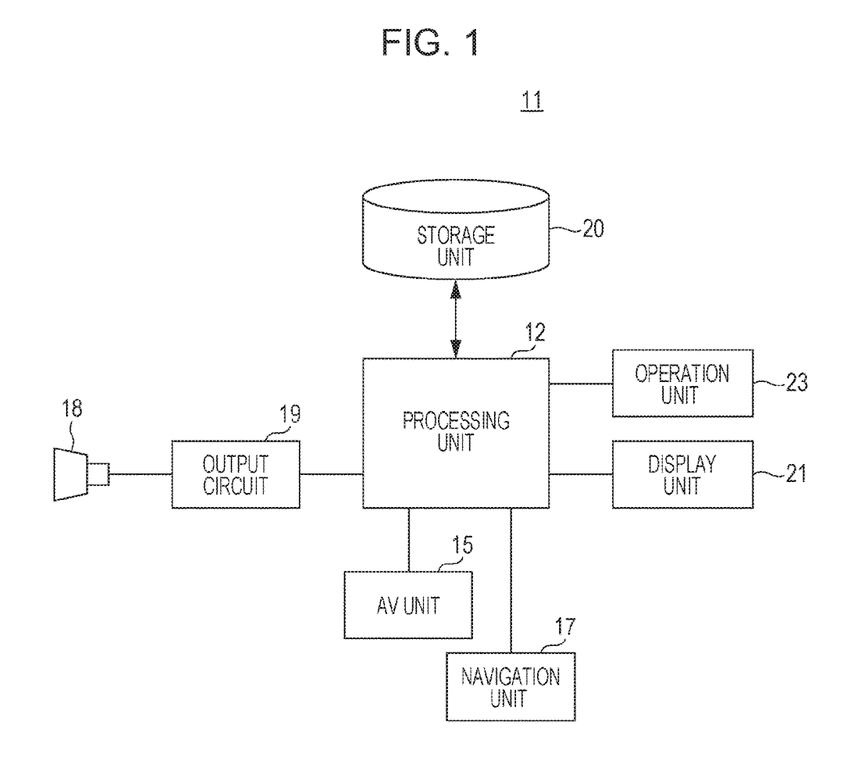
FIG. 1 is a block diagram illustrating the structure of an information processing apparatus according an embodiment of the present disclosure.

FIG. 1 is a block diagram illustrating the structure of a vehicle-mounted device 11 with navigation functions, which works as an information processing apparatus according an embodiment of the present disclosure.

As illustrated in FIG. 1, the vehicle-mounted device 11 has a processing unit 12 constituted by computer units such as, for example, a central processing unit (CPU), a read-only memory (ROM), a random-access memory (RAM), an input/output (I/O) interface, and a bus. An audiovisual (AV) unit 15, which can perform reproduction processing for various sound sources and video sources such as compact discs (CDs) and digital versatile discs (DVDs), and a navigation unit 17, such as a Global Positioning System (GPS) receiver, a gyroscope, an acceleration sensor, or the like, are connected to the processing unit 12. An output circuit 19 connected to a speaker 18 is also connected to the processing unit 12. Accordingly, voice signals involved in processing by the AV unit 15 and navigation unit 17 can be output from the speaker 18 through the output circuit 19. In addition, a storage unit 20 such as a hard disk drive, a flash memory, or the like, a display unit 21 structured by including a liquid crystal display (LCD) and the like, and an operation unit 23 are connected to the processing unit 12. The storage unit 20 can store various types of information such as music information and map information that are used by the AV unit 15 and navigation unit 17. The display unit 21 displays, for example, videos involved in various types of processing. The operation unit 23, which is a touch panel provided on the display unit 21, can accept commands required in various types of processing. The operation unit 23 can be implemented by push-button hard keys instead of soft keys on the above touch panel. It is also possible to implement the operation unit 23 by using both touch-panel keys and push-button keys.

Figure 2:
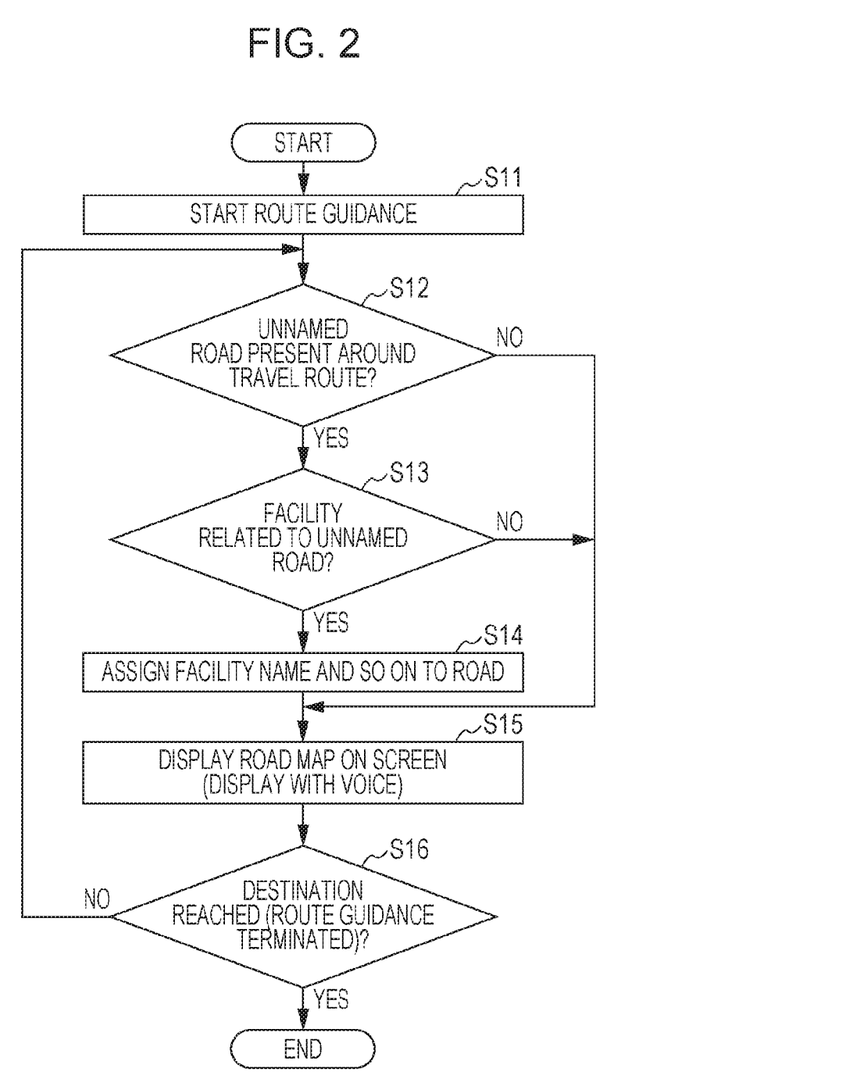
FIG. 2 is a flowchart illustrating a processing procedure executed by a processing unit included in the information processing apparatus in FIG. 1.

In the vehicle-mounted device 11, processing such as displaying a travel track is performed by a procedure illustrated in, for example, FIG. 2. In the description of the procedure in FIG. 2, the block diagram in FIG. 1 will be referenced at appropriate points.

In FIG. 2, when a destination is input from the operation unit 23, the processing unit 12 in the vehicle-mounted device 11 searches for a route to the destination according to the current position of the vehicle, the current position being obtained by the navigation unit 17, and road map information stored in the storage unit 20 (this search is performed by a guide route searching means) and starts route guidance (S11).

The processing unit 12 decides whether an unnamed road, which is a road in a prescribed range displayed on the screen, is present in a road map that includes a guide route to the destination (S12, which involves a road name deciding means). If the processing unit 12 decides that no unnamed road is present in the road map in the prescribed range that includes the guide route, that is, all roads displayed on the screen are named (the result in S12 is No), the processing unit 12 displays the road map with road names on the screen of the display unit 21 without alteration (S15, which involves a display control means).

If the processing unit 12 decides that an unnamed road is present in the road map in the prescribed range that includes the guide route (the result in S12 is Yes), the processing unit 12 decides whether a facility is related to the unnamed road (S13, which involves a facility deciding means). A facility related to the unnamed road is a facility located beside the unnamed road so as to face it. Information about the facility is included in link information about unnamed roads as facility information about the facility related to the unnamed road. If facility information is not included in the link information about unnamed roads, the processing unit 12 displays the road map on the screen of the display unit 21 without assigning a road name to the unnamed road (S15, which involves the display control means), assuming that no facility is related to the unnamed road (the result in S13 is No).

If the processing unit 12 decides that a facility is related to the unnamed road (the result in S13 is Yes), the processing unit 12 assigns the name of the facility to the unnamed road as a road name (S14, which involves a road name assigning means) and displays, on the screen of the display unit 21, a road map on which the road name based on the facility name is assigned (S15, which involves the display control means). Since the name of a related facility is assigned to an unnamed road as a road name and the road name is displayed in this way, it is possible to more accurately identify the position of the vehicle in route guidance. In the road map, the names of public facilities, shops, and other facilities and road names are displayed together with the assigned road name. Prescribed icons are also displayed to indicate prescribed facilities.

Figure 3A:
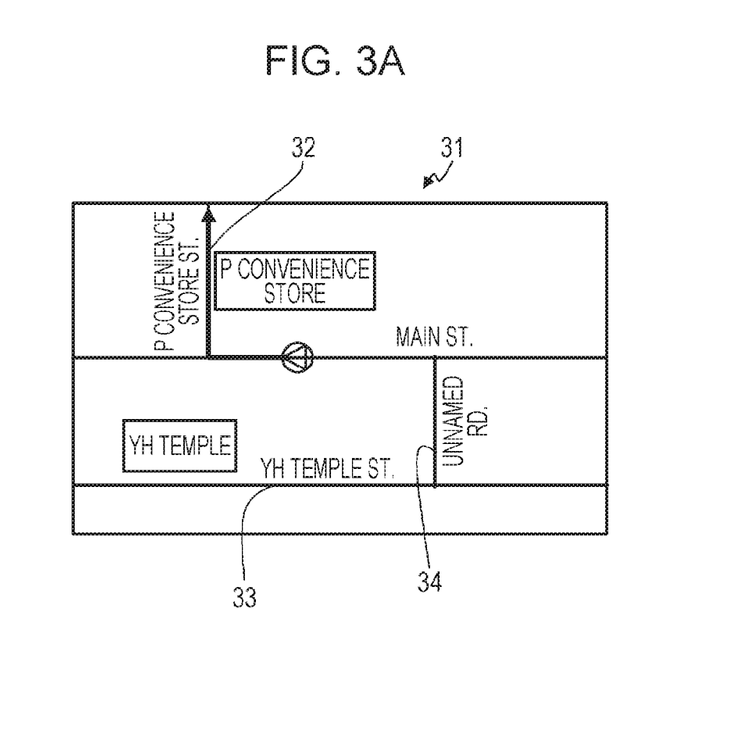
FIG. 3A illustrates a schematic road map displayed on the display unit of the information processing apparatus according to the embodiment of the present disclosure.
Figure 3B:
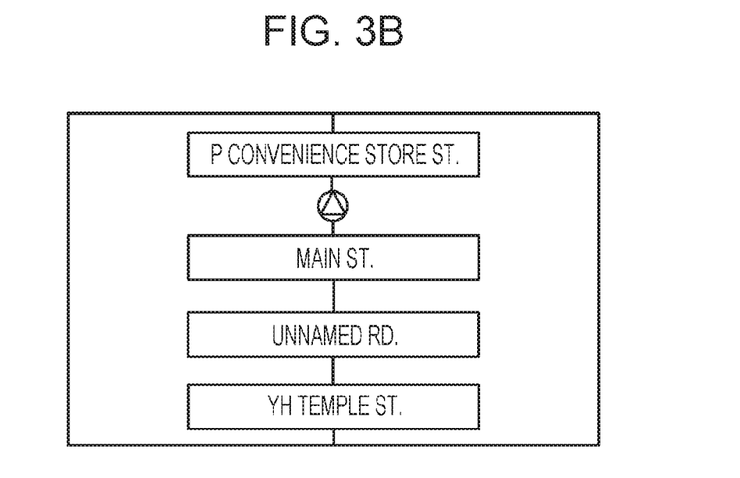
FIG. 3B is a schematic process chart for route guiding roads, the chart being displayed on the display unit of the information processing apparatus according to the embodiment of the present disclosure.

As illustrated in FIG. 3A, in a road map 31 displayed on the screen of the display unit 21, roads 32 and 33, which are unnamed on a conventional road map (see FIG. 4A), are assigned road names on the basis of the names of facilities related to the roads 32 and 33 and the assigned road names are displayed. A facility called the P Convenience Store is located beside the road 32 so as to face it. Thus, a name P Convenience Store St. is assigned to the road 32. Similarly, a facility called the YH Temple is located beside the road 33 so as to face it, so a name YH Temple St. is assigned to the road 33. These names are displayed on the road screen. As illustrated in FIG. 3B, which is a schematic route process chart indicating a screen for route processes that guides the travel of the vehicle, the road names P Convenience Store St. and YH Temple St. are assigned to roads that have been unnamed on the conventional road map (see FIG. 4B) and displayed. Therefore, it is possible to more clearly identify the position of the vehicle due to the assigned and displayed road names. If no facility is related to an unnamed road 34, the road is displayed as UNNAMED Rd. as before, as illustrated in FIG. 3A.

Figure 5A:
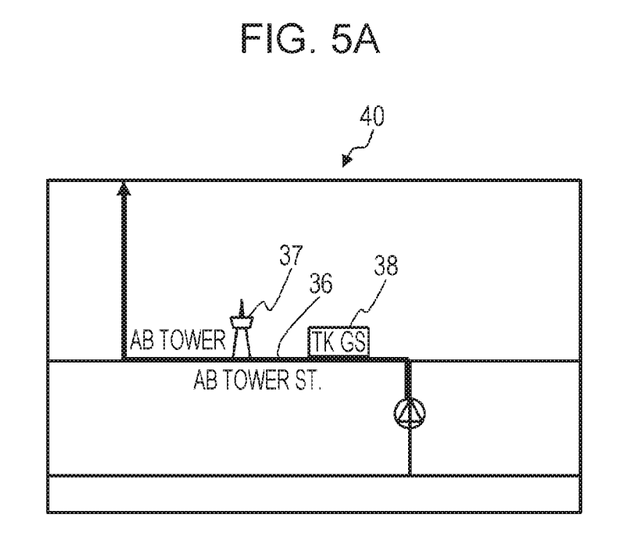
FIG. 5A schematically illustrates a condition under which a road name is assigned by the information processing apparatus according to the embodiment of the present disclosure.
Figure 5B:
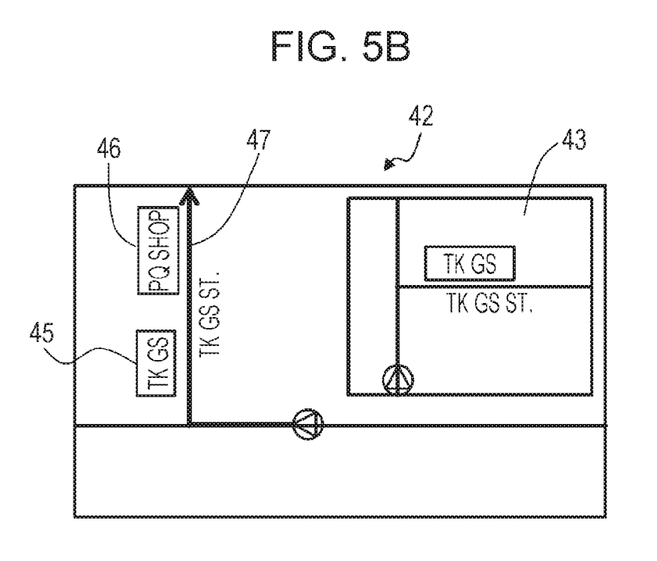
FIG. 5B schematically illustrates another condition under which a road name is assigned by the information processing apparatus according to the embodiment of the present disclosure.
Figure 6A:
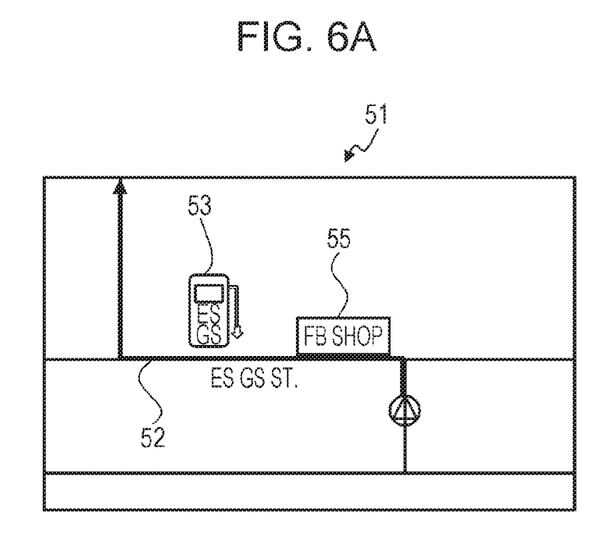
FIG. 6A schematically illustrates still another condition under which a road name is assigned by the information processing apparatus according to the embodiment of the present disclosure.
Figure 6B:
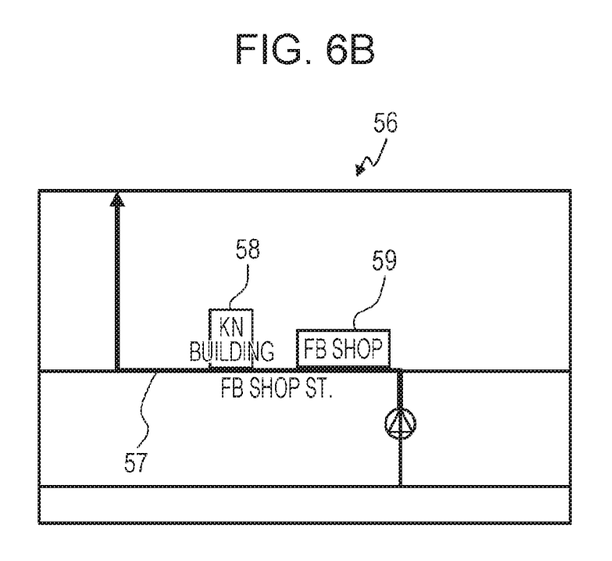
FIG. 6B schematically illustrates yet another condition under which a road name is assigned by the information processing apparatus according to the embodiment of the present disclosure.

If a plurality of facilities are related to an unnamed road, the processing unit 12 determines a road name according to a predetermined priority order in road name assignment. As illustrated in a road map 40 in FIG. 5A, if a radio tower (AB tower) 37 and a gas station (TK GS) 38 are present beside an unnamed road 36 as facilities related to the unnamed road 36, the processing unit 12 gives priority to the radio tower 37, which is highly public, and assigns a road name AB Tower St. to the unnamed road 36. Another priority order will be described. As illustrated in a road map 42 in FIG. 5B, if, for example, a gas station (TK GS) 45 and a selling office (PQ Shop) 46 are present beside an unnamed road 47, the processing unit 12 gives priority to the gas station (TK GS) 45, which is a facility illustrated in an enlarged view 43, and assigns a road name TK GS St. to the unnamed road 47. Still another priority order will be described. As illustrated in a road map 51 in FIG. 6A, if, for example, a gas station (ES GS) 53 and a selling office (FB Shop) 55 are present beside an unnamed road 52, the processing unit 12 gives priority to the gas station (ES GS) 53, which is indicated by an icon, and assigns a road name ES GS St. to the unnamed road 52. Although a commercial complex (KN Building) 58 and a selling office (FB Shop) 59 are present beside an unnamed road 57 as illustrated in a road map 56 in FIG. 6B, if the priority orders described above are not applicable, the processing unit 12 gives priority to the selling office (FB Shop) 59, which is a facility close to a traffic intersection, and assigns a road name FB Shop St. to the unnamed road 57. The above priority orders have been described for illustrative purposes only. Arbitrary priority orders can be set without being limited to the above priority orders.

Figure 7A:
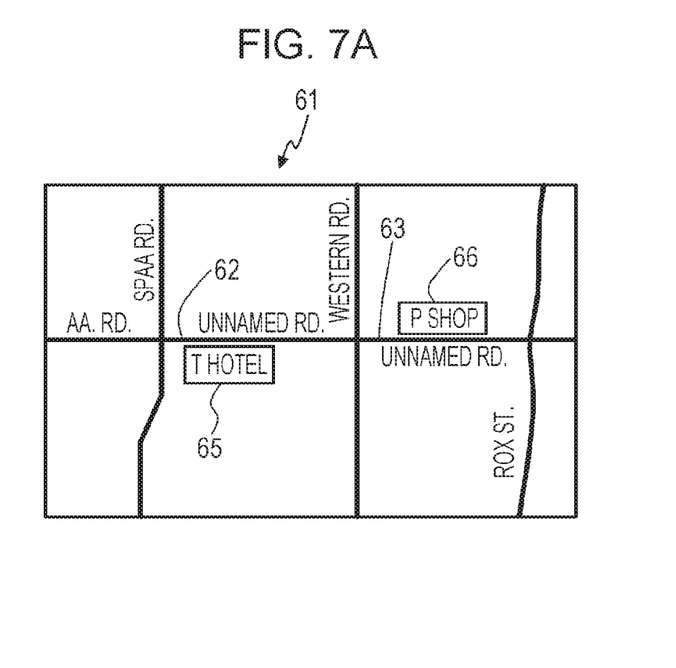
FIG. 7A illustrates a road map screen that displays unnamed roads.
Figure 7B:
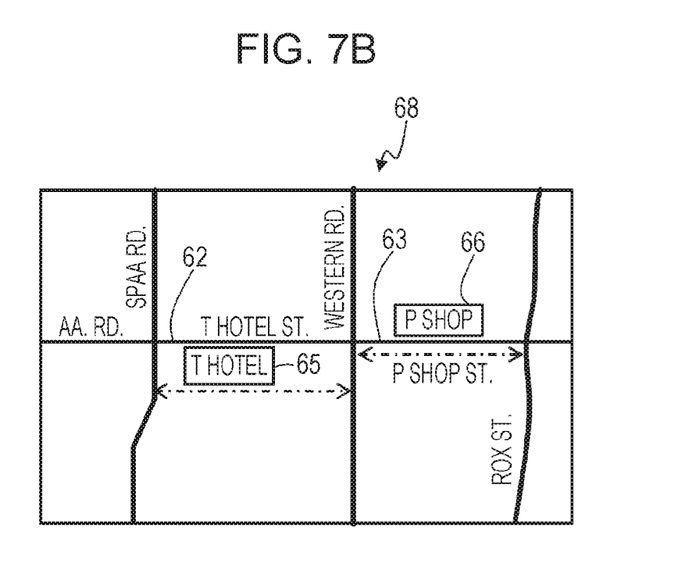
FIG. 7B illustrates ranges in each of which a name is assigned to an unnamed road present in the road map screen in FIG. 7A.
Figure 8A:
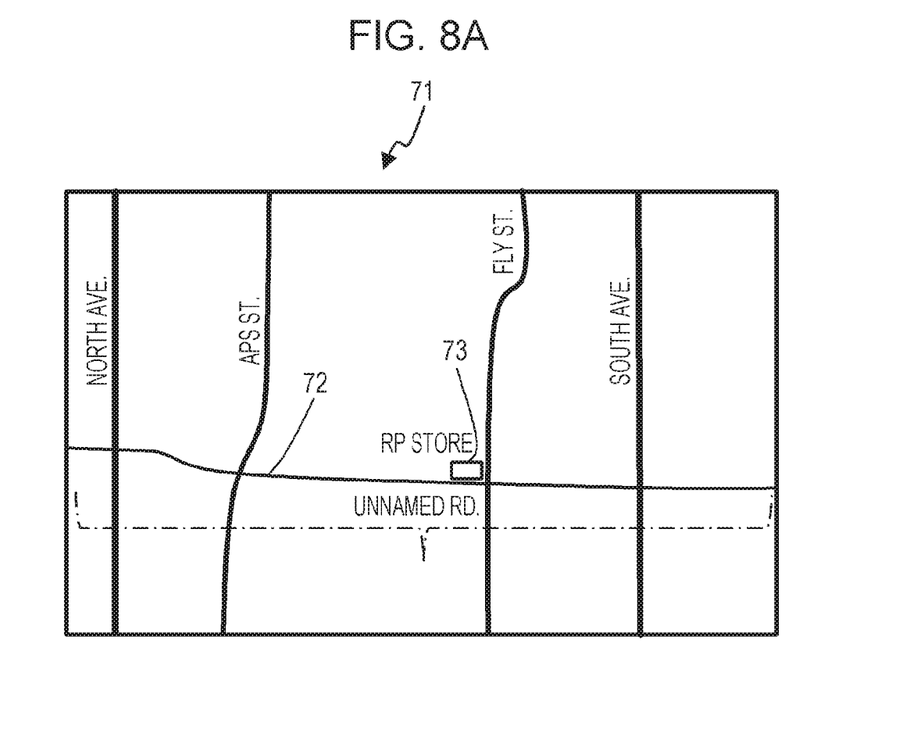
FIG. 8A illustrates another road map screen that displays an unnamed road.
Figure 8B:
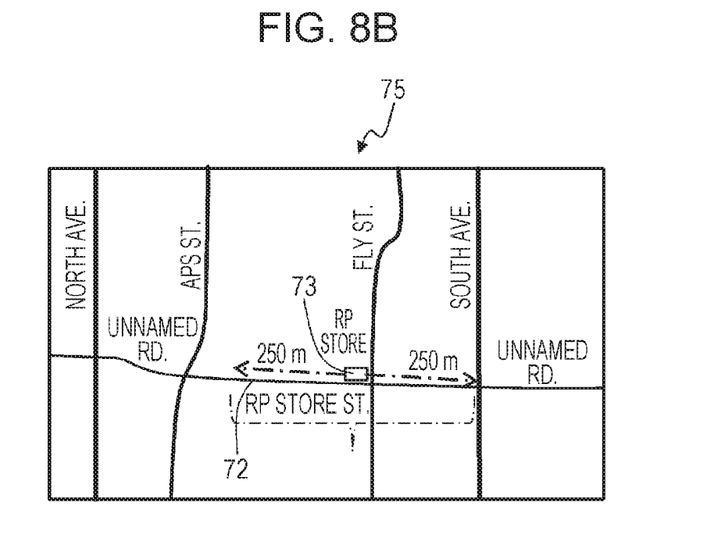
FIG. 8B illustrates a range in which a name is assigned to the unnamed road present in the road map screen in FIG. 7A.

Next, a range in which a road name is assigned to an unnamed road will be described. As illustrated in a road map 61 in FIG. 7A, a hotel (T Hotel) 65 is present beside an unnamed road 62 as a related facility, and a selling office (P Shop) 66 is present beside an unnamed road 63 as a related facility. In the road map 61, arterial roads SPAA Rd., Western Rd., and ROX St., which are indicated by bold lines, are also displayed. The road 62 is assigned a road name T Hotel St. on the basis of the hotel (T hotel) 65, and the road 63 is assigned a road name P Shop St. on the basis of the selling office (P shop) 66, as illustrated in a road map 68 in FIG. 7B. However, each of these road names is assigned only within a range in which the road is connected to two of the above arterial roads. Specifically, the road name T Hotel St. is assigned to the road 62 between the arterial roads SPAA Rd. and Western Rd. (the road name is assigned in a range indicated by a dash-dot line). Similarly, the road name P Shop St. is assigned to the road 63 between the arterial roads Western Rd. and ROX St. (the road name is assigned in a range indicated by a dash-dot line). When a road name based on a facility name is assigned within a range in which the road is connected to arterial roads in this way, it is possible to prevent unlimited extension of a road range in which a road assigned a road name. Therefore, the convenience of, for example, easy guide to an arterial road is improved. It is also possible to assign a road name to a road within a certain range from a facility on which the road name is based. As illustrated in a road map 71 in FIG. 8A, a selling office (RP Store) 73 is present beside an unnamed road 72. In this case, as illustrated in a road map 75 in FIG. 8B, a road name can be assigned to the unnamed road 72 and displayed within a range of 500 meters centered around the selling office (RP Store) 73, 250 meters forward (to the left) and 250 meters backward (to the right) on the road 72, the range being indicated by the dash-dot line in FIG. 8B. When a road name based on a facility name is assigned within a certain distance range, the facility and road are closely related to each other, so the current position of the vehicle can be clearly identified, for example.

Referring again to FIG. 2, the processing unit 12 decides whether after the road map with the road name displayed had been displayed on the screen of the display unit 21 as described above, the vehicle has arrived at the destination and the route guidance will be terminated (S16). If the vehicle has arrived at the destination (the result in S16 is Yes), the processing unit 12 terminates the assignment of the road name to the unnamed road and the displaying of the assigned road name. If the vehicle has not arrived at the destination and the route guidance will be continued (the result in S16 is No), the processing unit 12 further decides whether an unnamed road is present in the road map that includes the travel route. If the processing unit 12 decides that an unnamed road is present in the road map, the processing unit 12 assigns a road name on the basis of the name of a related facility located beside the road and displays the assigned road name in the road map on the screen of the display unit 21.

As described above, in road guidance to the destination by the vehicle-mounted device 11, road names are displayed together with roads so that the current position of the vehicle can be more accurately identified. If an unnamed road is present, a road name based on the name of a facility located beside the unnamed road is assigned. Therefore, even if a road name is not present in a road map database, accurate identification of the current position of the vehicle and other conveniences are possible. Although, in this embodiment, a vehicle-mounted device has been described as the information processing apparatus according to the present disclosure, this is not a limitation. For example, the present disclosure can also be applied to, for example, a mobile terminal such as a smart phone and a personal computer (PC).

Figure 9A:
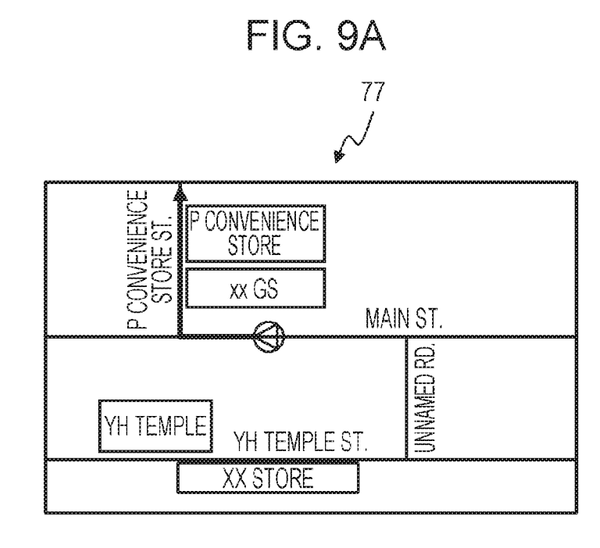
FIG. 9A illustrates a road map screen on which road names are assigned, the screen being displayed on the display unit of the information processing apparatus according to the embodiment of the present disclosure.
Figure 9B:
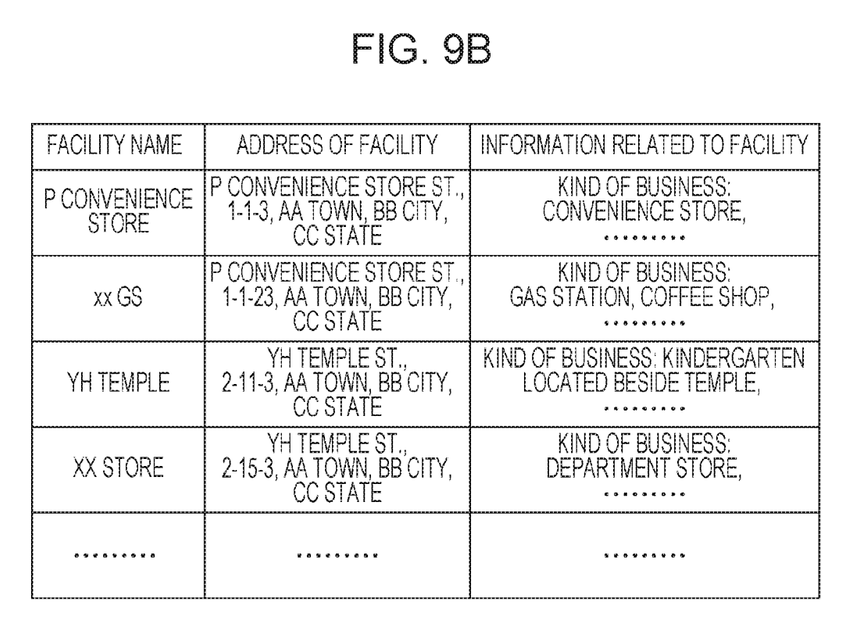
FIG. 9B is data list indicating a state in which the road names assigned in FIG. 9A are added as part of facility addresses in facility information included in road map information.

When a road name based on a facility name is assigned to an unnamed road, if the assigned road name is related to, for example, the addresses of facilities present beside the road, the vehicle-mounted device 11 can make a search as described below. In a road map 77 in FIG. 9A, the road names P Convenience Store St. and YH Temple St. are assigned to unnamed roads on the basis of facility names. As illustrated in FIG. 9B, in the facility address column, P Convenience Store St. is added to the original addresses of the facilities P Convenience Store and xx GS located beside the P Convenience Store St. Similarly, in the facility address column, YH Temple St. is added to the original addresses of the facilities YH Temple and XX Store located beside the YH Temple St. If the user wants to search for a gas station located beside the P Convenience Store St., when the user enters P Convenience Store St. and "gas station" from the operation unit 23 of the vehicle-mounted device 11 in full-text search, a match with the gas station xx GS will be found. If the user wants shopping around the YH Temple St., when the user enters YH Temple St. and "department store" in full-text search, a match with the XX Store will be found. As described above, when a road name assigned on the basis of a facility name is added to, for example, the address of a facility located beside the road, it is possible to access an intended facility through a search in which the assigned road name is added, expanding the range of search and improving convenience.

As described above, according to the present disclosure, if a road included in a road map is decided to have no name, a road name is assigned to the road on the basis of facility information about a facility related to the road, so positional information in the road map can be more accurately provided. Therefore, the present disclosure is useful as an information processing apparatus that displays a road map including road names on a display unit according to road map information, an information processing method, and a program that causes a computer to execute processing in the information processing apparatus.

What is claimed is:

1. An information processing apparatus having a storage unit that stores road map information about a road map and a display control means for displaying a road map including a road name on a display unit according to the road map information, the apparatus comprising:
    a road name deciding means for deciding whether a road included in the road map has a road name;
    a facility deciding means for deciding, if the road name deciding means has decided that the road has no road name, whether a facility is related to the road; and,
    a road name assigning means for assigning, if the facility deciding means has decided that a facility is related to the road, a name to the road on the basis of facility information about the facility.

2. The information processing apparatus according to claim 1, further comprising a guide route searching means for searching for a guide route to an entered destination according to the road map information, wherein
    the road name deciding means decides whether a road in a prescribed range that includes the guide route has a road name.

3. The information processing apparatus according to claim 1, wherein the road name assigning means follows a predetermined priority order to assign a name to the road on the basis of the facility information about the facility related to the road.

4. The information processing apparatus according to claim 1, further comprising:
    a road name storing means for causing the storage unit to store facility information about a facility related to the road to which the road name has been assigned by the road name assigning means, the storage device storing the facility information in relation to the road name; and
    a searching means for searching for the road map information, which is stored in the storage unit, according to input information about a facility, the input information being entered from an operation unit; wherein
    the searching means searches for the road map information according to input information including the road name.

5. The information processing apparatus according to claim 1, wherein facility information including the assigned road name is stored in the storage unit in relation to link information about a road included in the road map information.

6. An information processing method having a display control step of displaying a road map including a road name on a display unit according to road map information about a road map, the method comprising:
    a road name deciding step of deciding whether a road included in the road map information has a road name;
    a facility deciding step of deciding, if the road has been decided to have no road name in the road name deciding step, whether a facility is related to the road; and
    a road name assigning step of assigning, if a facility has been decided to be related to the road in the facility deciding step, a name to the road on the basis of facility information about the facility.

7. The information processing method according to claim 6, further comprising a guide route searching step of searching for a guide route to an entered destination according to the road map information, wherein
    in the road name deciding step, whether a road in a prescribed range that includes the guide route has a road name is decided.

8. The information processing method according to claim 6, wherein, in the road name assigning step, a predetermined priority order is followed to assign a name to the road on the basis of the facility information about the facility related to the road.

9. The information processing method according to claim 6, further comprising:
    a road name storing step of causing the storage unit to store facility information about a facility related to the road to which the road name has been assigned in the road name assigning step, the storage device storing the facility information in relation to the road name; and
    a searching step of searching for the road map information, which is stored in the storage unit, according to input information about a facility, the input information being entered from an operation unit; wherein
    in the searching step, the road map information is searched for according to input information including the road name.

10. The information processing method according to claim 6, wherein facility information including the assigned road name is stored in the storage unit in relation to link information about a road included in the road map information.

11. A program causing a computer to execute processing in an information processing apparatus that displays a road map including a road name on a display unit according to road map information about a road map, the program causing the computer to execute:
    a road name deciding step of deciding whether a road included in the road map information has a road name,
    a facility deciding step of deciding, if the road has been decided to have no road name in the road name deciding step, whether a facility is related to the road, and
    a road name assigning step of assigning, if a facility has been decided to be related to the road in the facility deciding step, a name to the road on the basis of facility information about the facility.

12. The program according to claim 11, wherein:
    the program causes the computer to further execute a guide route searching step of searching for a guide route to an entered destination according to the road map information; and in the guide route searching step, whether a road in a prescribed range that includes the guide route has a road name is decided.

13. The program according to claim 11, wherein, in the road name assigning step, a predetermined priority order is followed to assign a name to the road on the basis of the facility information about the facility related to the road.

14. The program according to claim 11, wherein:
the program causes the computer to further execute
a road name storing step of causing the storage unit to store facility information about a facility related to the road to which the road name has been assigned in the road name assigning step, the storage device storing the facility information in relation to the road name, and
a searching step of searching for the road map information, which is stored in the storage unit, according to input information about a facility, the input information being entered from an operation unit; and
in the searching step, the road map information is searched for according to input information including the road name.

15. The program according to claim 11, wherein facility information including the assigned road name is stored in the storage unit in relation to link information about a road included in the road map information.

* * * * *